United States Patent
Damron et al.

(10) Patent No.: US 7,236,318 B2
(45) Date of Patent: Jun. 26, 2007

(54) BUILT IN FULL SPEED NONRETURN TO ZERO TEST METHOD AND APPARATUS FOR A DATA STORAGE DEVICE CONTROLLER

(75) Inventors: Jonathan L. Damron, Boulder, CO (US); Hui Su, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 441 days.

(21) Appl. No.: 10/358,656

(22) Filed: Feb. 4, 2003

(65) Prior Publication Data

US 2003/0147165 A1    Aug. 7, 2003

Related U.S. Application Data

(60) Provisional application No. 60/355,670, filed on Feb. 5, 2002.

(51) Int. Cl.
| | |
|---|---|
| G11B 27/36 | (2006.01) |
| G11B 20/10 | (2006.01) |
| G11B 5/09 | (2006.01) |
| G11B 20/14 | (2006.01) |
| G11B 20/16 | (2006.01) |
| G06F 3/06 | (2006.01) |
| G06F 12/00 | (2006.01) |

(52) U.S. Cl. ............................ 360/31; 360/39; 360/41; 360/51; 360/55; 711/4; 714/733

(58) Field of Classification Search ................ 360/53, 360/51, 31, 55, 69, 75; 341/68, 69
See application file for complete search history.

(56) References Cited

U.S. PATENT DOCUMENTS

| | | | | | |
|---|---|---|---|---|---|
| 4,882,671 | A | * | 11/1989 | Graham et al. | ................ 711/4 |
| 5,812,335 | A | * | 9/1998 | Kool et al. | .................. 360/51 |
| 5,925,144 | A | * | 7/1999 | Sebaa | ......................... 714/733 |
| 6,583,942 | B2 | * | 6/2003 | Seng et al. | .................. 360/31 |

* cited by examiner

*Primary Examiner*—William Korzuch
*Assistant Examiner*—Daniell L. Negrón
(74) *Attorney, Agent, or Firm*—Shumaker & Sieffert, P.A.

(57) ABSTRACT

A data storage device such as a disc drive is described that has a controller chip with an integral embedded read/write channel on the chip. The chip includes a built in test capability for testing the controller logic via the device microprocessor and a nonreturn to zero test FIFO and control logic module. The module includes an internal first in/first out buffer (FIFO) that has variable data speeds and is provided on the chip to provide the test capability thereby permitting testing that would otherwise be difficult to perform.

9 Claims, 4 Drawing Sheets

BUILT IN FULL SPEED NONRETURN TO ZERO TEST METHOD AND APPARATUS FOR A DATA STORAGE DEVICE CONTROLLER

RELATED APPLICATIONS

This application claims priority of U.S. provisional application Ser. No. 60/355,670, filed Feb. 5, 2002.

FIELD OF THE INVENTION

This application relates generally to data storage devices and more particularly to a data storage device controller integrated circuit that has a built in controller test functionality.

BACKGROUND OF THE INVENTION

The control circuitry for a data storage device such as a magnetic disc drive typically resides on discrete chips mounted on a printed circuit board fastened to the underside of the disc drive. There is a trend in data storage device development to make the devices smaller while maintaining or increasing the device storage capacity. Recently, this trend as lead to the incorporation of most if not all of the circuitry and control systems previously found on the printed circuit board into a single integrated circuit known as a SOC (System On a Chip). The SOC incorporates several discrete devices on a single silicon substrate. This configuration can improve performance, reduce cost, and reduce power consumption.

However, there is a serious drawback to such configurations. Previously visible device input/output (IO) pads are no longer visible making testing very difficult or impossible. In the case of a data storage device such as a magnetic, or magneto-optical disc drive controller with an embedded read/write channel in an SOC, the controller/channel interface is no longer visible or directly controllable. The Non Return to Zero (NRZ) data bus between the controller and the channel, in particular, makes testing of the controller in a standalone manner impossible. Attempts to test the controller logic via the internal channel are very difficult, time consuming, and expensive.

Accordingly there is a need for providing a simple mechanism in a data storage device that has an integrated read/write channel control to permit testing of controller functions. The present invention provides a solution to this and other problems, and offers other advantages over the prior art.

SUMMARY OF THE INVENTION

Against this backdrop the present invention has been developed. The present invention is a data storage device controller that incorporates a test non-return to zero (NRZ) first in/first out buffer (FIFO) and control logic module in the NRZ data path. This NRZ test FIFO and control logic module is built in to the control System on a Chip (SOC) and is transparent during normal data storage device operation and becomes operational when a NRZ test mode of operation is set.

The NRZ test FIFO and control logic module of the present invention, in test read mode, can receive microcontrollable data patterns from the data storage device microprocessor and provide them to the controller side of the NRZ Data bus with variable data speeds. In a test write mode, the FIFO and control logic module can also receive test media write data from the controller side into the FIFO. The FIFO content is then compared to expected known data to verify controller functionality.

Throughout this specification reference will be made to "symbols" in combination with data. A "symbol", as used in this specification, is defined as the width of the Non-Return To Zero data bus. The NRZ test FIFO also preferably is a predetermined size. It is currently preferably a 16-symbol bidirectional FIFO with loop back capability in which every symbol in the FIFO is a microprocessor read/write register. In a preferred embodiment, used in a magnetic disc drive, the current symbol size is 10 bits.

These and various other features as well as advantages which characterize the present invention will be apparent from a reading of the following detailed description and a review of the associated drawings.

DETAILED DESCRIPTION

Figure 1:
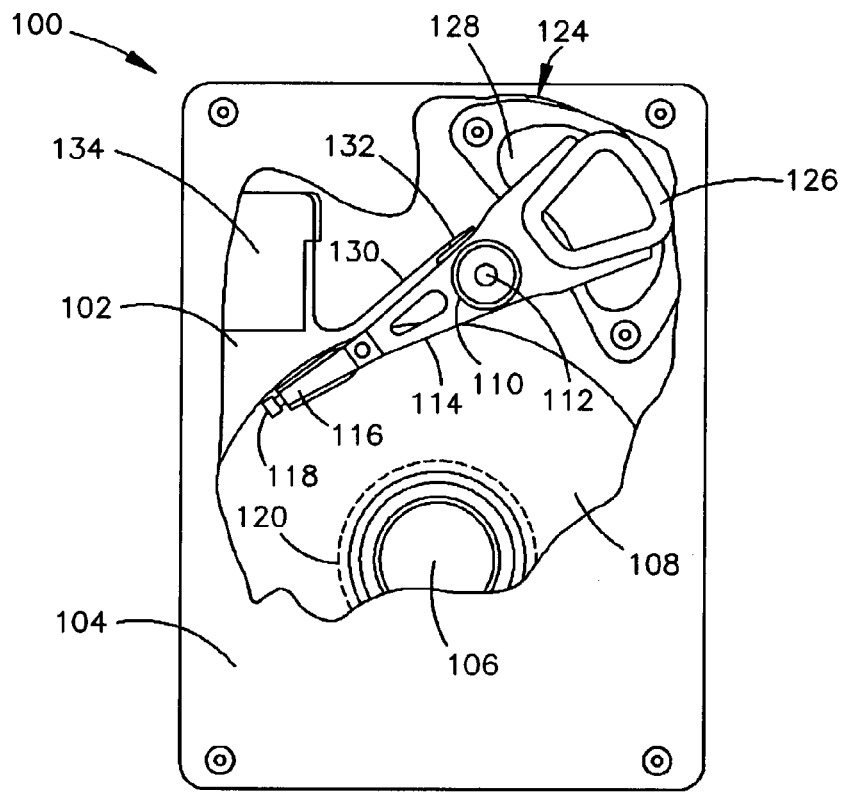
FIG. 1 is a plan view of a disc drive incorporating a preferred embodiment of the present invention showing the primary internal components.

A disc drive 100 constructed in accordance with a preferred embodiment of the present invention is shown in FIG. 1. The disc drive 100 is exemplary of a data storage device incorporating the present invention. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 that rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes a fluid bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118 The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
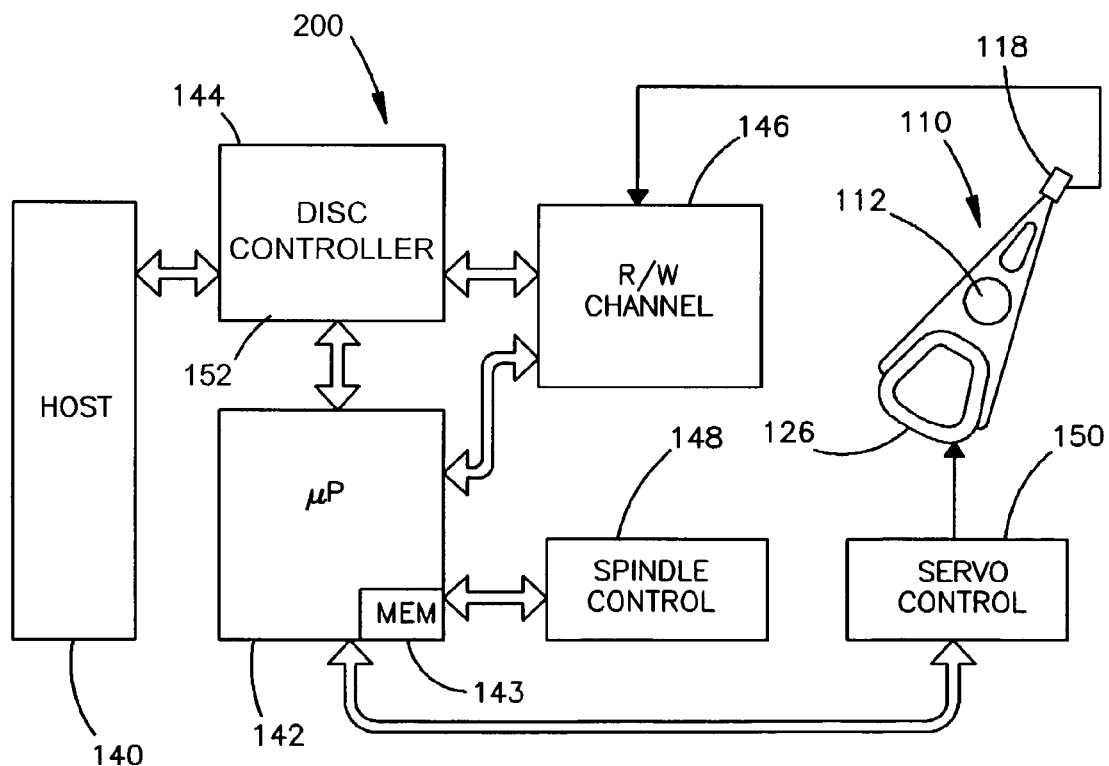
FIG. 2 is a control block diagram of a disc drive incorporating the Non Return To Zero (NRZ) Test FIFO in accordance with a preferred embodiment of the present invention.

Referring now to FIG. 2, shown therein is a functional block diagram of the disc drive control system 200 of disc drive 100 of FIG. 1, generally showing the main functional circuits which are resident on the disc drive printed circuit board and used to control the operation of the disc drive 100 during normal disc drive operation. The disc drive control system 200 is operably connected to a host computer 140 in a conventional manner. Control communication paths are provided between the host computer 140 and a disc drive microprocessor 142 via the controller 144, with the microprocessor 142 generally providing top level communication and control for the disc drive 100 in conjunction with programming for the microprocessor 142 stored in microprocessor memory (MEM) 143. The MEM 143 can include random access memory (RAM), read only memory (ROM) and other sources of resident memory for the microprocessor 142.

The discs 108 are rotated at a constant high speed by a spindle motor control circuit 148, which typically electrically commutates the spindle motor 106 (FIG. 1) through the use of back electromotive force (BEMF) sensing. During a seek operation, wherein the actuator 110 moves the heads 118 between tracks, the position of the heads 118 is controlled through the application of current to the coil 126 of the voice coil motor 124. A servo control circuit 150 provides such control. During a seek operation the microprocessor 142 receives information regarding the velocity of the head 118, and uses that information in conjunction with a velocity profile stored in memory 143 to communicate with the servo control circuit 150, which will apply a controlled amount of current to the voice coil motor coil 126, thereby causing the actuator assembly 110 to be pivoted.

Data is transferred between the host computer 140 or other device and the disc drive 100 by way of a controller 144, which includes a data buffer to facilitate high speed data transfer between the host computer 140 or other device and the disc drive 100. Data to be written to the disc drive 100 is thus passed from the host computer 140 to the controller 144 and then to a read/write channel 146, which encodes and serializes the data and provides the requisite write current signals to the heads 118. To retrieve data that has been previously stored in the disc drive 100, read signals are generated by the heads 118 and provided to the read/write channel 146, which performs decoding and error detection and correction operations and outputs the retrieved data to the controller 144 for subsequent transfer to the host computer 140 or other device. Such operations of the disc drive 100 are well known in the art and are discussed, for example, in U.S. Pat. No. 5,276,662 issued Jan. 4, 1994 to Shaver et al.

Figure 3:
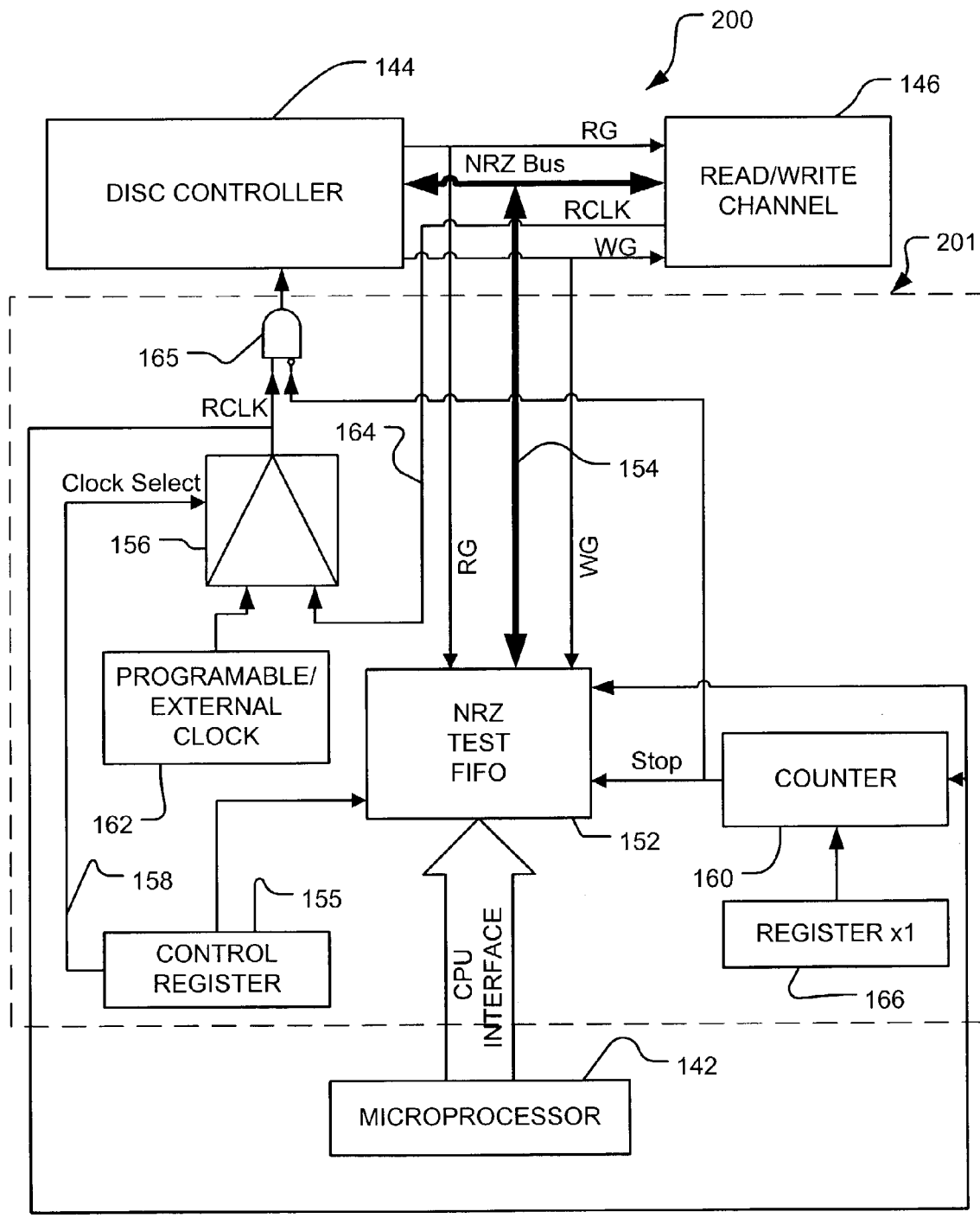
FIG. 3 is a more detailed diagram of a portion of the control block diagram of the disc drive shown in FIG. 2 showing details of the FIFO and control logic module in accordance with the present invention.

Most of the circuitry shown in FIG. 2 is incorporated into a single integrated circuit chip in the present invention. Thus the interface between the controller 144 and the read/write channel 146 is not visible or directly controllable. The present invention provides a means built into the chip for functional test communication to and from the controller 144 when a controller test mode of operation is chosen. During normal operation, the communication paths between the blocks are as shown in FIG. 2. FIG. 3 shows how the present invention is integrated in to the control circuitry shown in FIG. 2 during controller test operations.

The present invention provides micro controllable data patterns to the controller side of a NRZ data bus 154 via a non-return to zero (NRZ) first in/first out buffer (FIFO) and control logic module 201 with variable data speeds. This portion of the system is shown in FIG. 3. FIG. 3 illustrates the functionality of a Non Return on Zero Test FIFO 152 in accordance with the present invention. The FIFO 152 is connected between and to the microprocessor 142, the controller 144 and the read/write channel 146.

The controller 144 directly connects to the NRZ data bus. A control register 155, used to select clock speeds during test mode operation, is connected to the FIFO 152. The clock select signal from the control register 155 is fed to the clock multiplexer 156 on line 158. The reference clock (RCLK) output of the multiplexer 156 is fed to the controller 144, a counter 160, which receives content of register 166, and to the FIFO 152.

A programmable internal clock 164 or a programmable external clock 162 provides the necessary clock pulses for tests conducted in accordance with the present invention. This programmable external clock 162 is connected to inputs of the multiplexer 156. In addition, the internal reference clock signal 164 from the read/write channel 146 is fed via another input into the multiplexer 156

The controller 144 provides a read gate signal RG to the read/write channel and to the FIFO 152. The controller 144 also provides a write gate signal WG to the read/write channel 146 and to the FIFO 152.

The counter 160 counts the number of RCLK pulses out of the multiplexer 156 and issues a stop signal to the FIFO 152 when a predetermined number of pulses, provided by Registerx1 166, have been received. The counter 160 provides a stop input to a clock gate 165 which in turn stops future RCLK signals from going to the controller 144 during the test modes of operation of the present invention. The FIFO 152 is currently preferably a 16-symbol bidirectional FIFO buffer with loop back capability. Other sizes of FIFOs are also envisioned within the scope of the invention, and thus reference to a 16-symbol buffer configuration is merely exemplary. Every symbol in the FIFO operates, in fact, functionally as a microprocessor read/write register. This allows us to load FIFO with data for a media write and conversely check data within the FIFO for media reads to evaluate functionality of the controller 144.

The NRZ test FIFO and control logic module 201 has two modes of operation: pass through for normal data storage device operations, and test mode for controller testing functions. The test operation mode has two operational modes. These modes are a Read Mode and a Write Mode. During the Read Mode, data are sent to the controller 144 from FIFO 152. The speed of the read depends on the clock source rate chosen via the control register 155. The selected rate is RCLK 164 from the read/write channel 146 or an external clock signal from clock 162. The length of the data burst is determined by the content of REGx1 166 This register is used to load the counter block 160.

During the test Write Mode, the NRZ test FIFO and control logic module 201 can be used to capture and store data written by the controller 144 to the read/write channel 146 via the FIFO 152. The microprocessor 142 can then read back the data from the FIFO 152 and verify its correctness.

This system allows for simple and inexpensive testing of the controller logic for both tests during controller chip manufacture and board level testing during storage device assembly. More specifically, the system shown in FIG. 3 can be used to test the disc sequencer, the sequencer FIFO and Error Correction Code (ECC) operational blocks inside the controller at full functional speed. The result is that test time at chip vendors can be vastly reduced and the need for complex analog stimuli for the channel is removed with no loss of controller test capability, thus reducing costs. Another use of this system is to debug disc sequencing firmware, sequencer FIFO, ECC and buffer manager at a drive level. Failure analysis can identify failures and isolate them to either the read/write channel 146 or the controller 144 with this test module 201 present on the chip.

Figure 4:
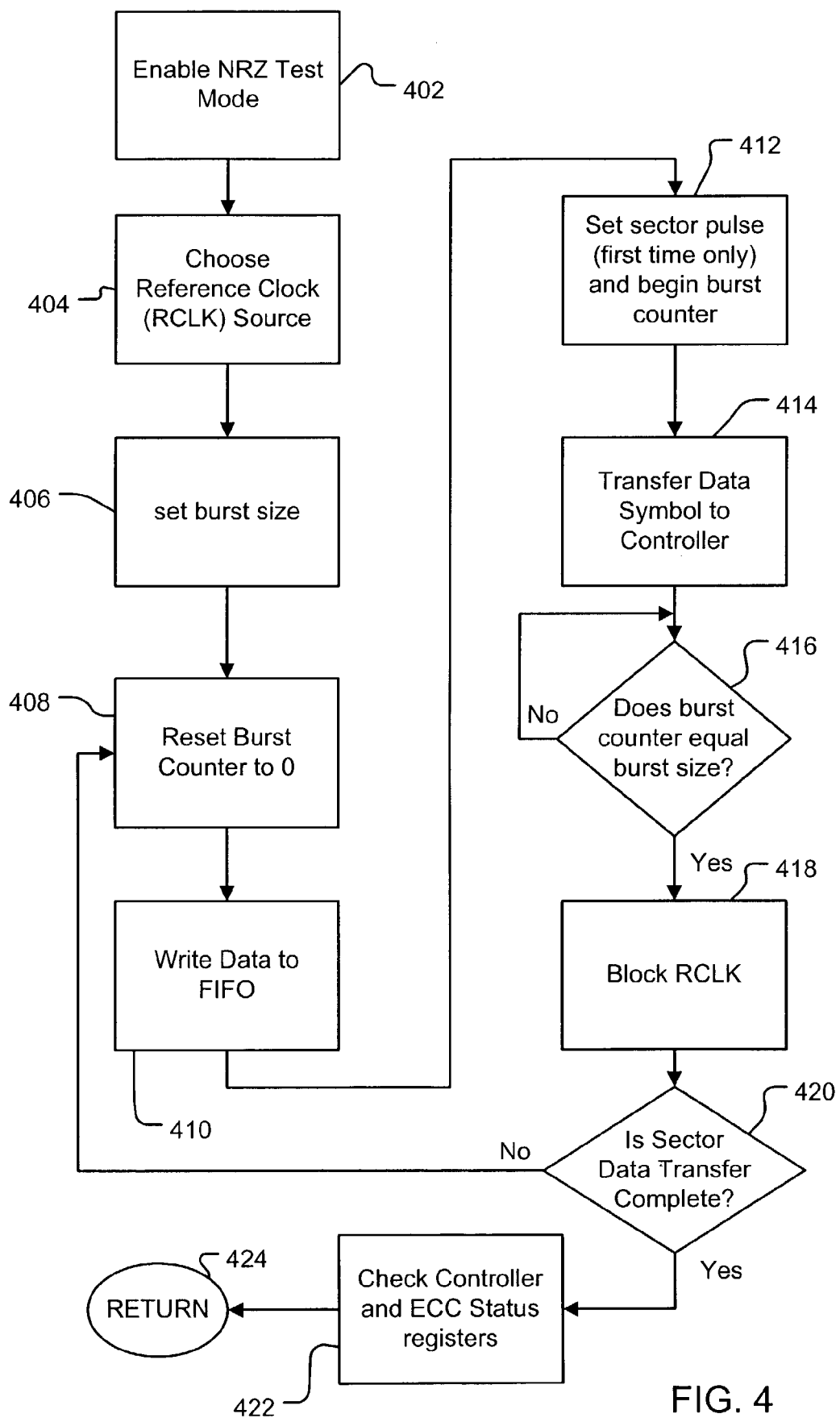
FIG. 4 is an operational flow diagram of the NRZ Test FIFO and control logic module operating in a test read mode in accordance with a preferred embodiment of the present invention.
Figure 5:
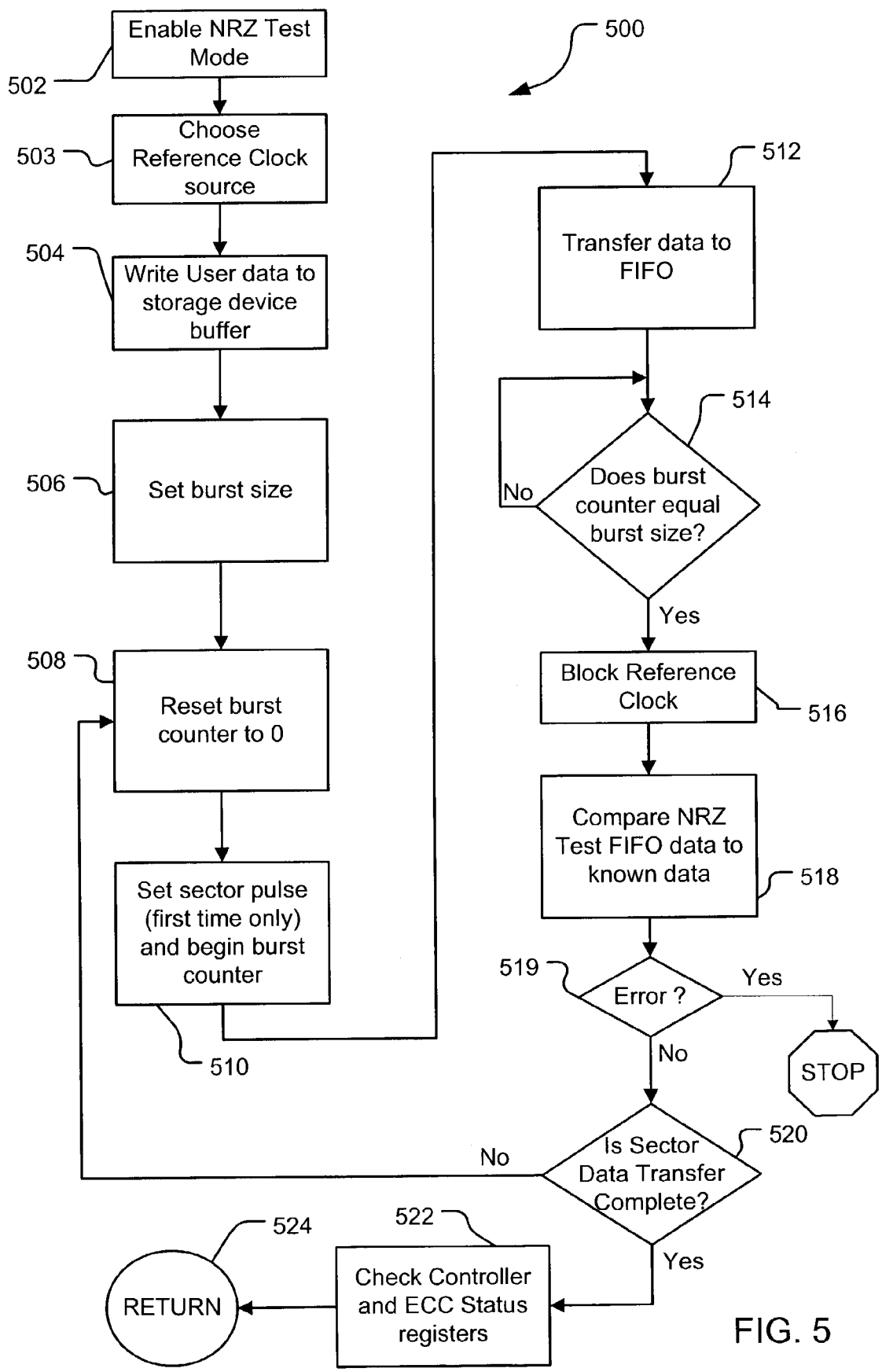
FIG. 5 is an operational flow diagram of the NRZ Test FIFO and control logic module operating in a test write mode in accordance with a preferred embodiment of the present invention.

Operation of the NRZ test FIFO and control logic module 201 will now be explained with reference to FIGS. 4 and 5. A burst read mode operation 400 is shown in FIG. 4. Operation begins in operational block 402. In operation 402 the NRZ test mode is enabled. Control then transfers to operation 404.

In operation 404, instruction is provided to the control register 155 to set the RCLK source and frequency. The control register 155 then sets a clock select signal 158 into the multiplexer 156. Control then transfers to operation 406.

In operation 406, the data burst size is set in the REGx1 166. Control then transfers to operation 408. Here the burst counter 160 is set to zero and control transfers to operation 410.

In operation 410, the preamble data and sync symbol are written to the NRZ Test FIFO 152 by the microprocessor 142. Control then transfers to operation 412.

In operation 412, a sector pulse is set in the controller 144 (first time through only). This causes the Read Gate from the controller 144 to cause the preamble data and sync symbol, written in operation 410, to be transferred to the controller 144 by the module 201. This data is essentially simulated data read from the read/write channel 146. Then control transfers to operation 416 where the count in the burst counter 160 is queried.

In query operation 416, when the burst counter 160 equals the predefined burst size set in operation 406, a stop signal is asserted and control passes to operation 418 where the RCLK is blocked and a stop signal provided to the FIFO 152. The stop signal is also sent to the gate 165. The receipt of the stop signal in the gate 165 causes the controller 144 to stop and await restoration of the RCLK signal. Control then transfers to query operation 420.

Query operation 420 asks whether the sector data is complete, i.e., whether there is another data burst waiting to be written to the FIFO 152. If the answer is no, the data is incomplete, control transfers back to operation 408 where the burst counter 160 is again reset to zero and additional data is transmitted to the FIFO 152 from the microprocessor 142. Except that this time, user data is transferred, not the preamble and symbol data. This loop is continued, i.e. repeated, from operations 408 through 420, except that in operation 412, the sector pulse is not set during the second and subsequent iterations for a sector, until all user data and ECC data in a test sector are transferred. Control transfers then, if the answer in operation 420 is yes, to operation 422.

In operation 422, the controller 144 and ECC status registers are checked to ascertain whether the integrity of the data burst written to the controller, simulating data provided to the controller from the read/write channel 146, has been maintained by the read. Control then returns in operation 424.

The write mode of operation 500 of the module 201 is best explained with reference to FIG. 5. The write mode of operation 500 begins in operation 502 in which the NRZ Test mode is enabled. Control then transfers to operation 503.

In operation 503, the reference clock source is chosen, either the internal clock signal 164 or an external programmable clock 162. The data speed of RCLK is set via control line 158 from the control register 155 to the multiplexer 156. Control then transfers to operation 504.

In operation 504, user data is written to a data buffer in the data storage device 100. Control then transfers to operation 506 where the burst size is set in REGx1 166, as was previously done in operation 406 Control then transfers to operation 508, where the burst counter 160 is reset to zero. Control then transfers to operation 510.

In operation 510, a sector pulse is set (first time through only), and the burst counter is started counting pulses and the writing of data is started from the data buffer through the controller 144. Control then transfers to operation 512 where a preamble data symbol and sync symbol are written via the controller 144 to the NRZ Test FIFO 152. Control then transfers to query operation 514.

In query operation 514, the query is made whether the burst counter 160 equals the burst size stored in REGx1 166. If not, data continues to be written to the NRZ Test FIFO 152 and control returns to ask the query again. If the answer is yes, then control transfers to operation 516. In operation 516, counter 160 asserts a stop signal to the FIFO 152 and the clock gate 165. This stops transmission from the controller 144 and the data write is terminated until the RCLK is restored to the controller 144. Control then transfers to operation 518.

In operation 518, the data resident in the NRZ Test FIFO 152 is compared to known data that was sent to the controller 144 (earlier held in the data storage device buffer). Control then transfers to query operation 519. Query operation 519 asks whether there is was an error indicated in operation 518. If there was an error, process control terminates and the error is reported. If no error flag is set, control transfers to operation 520.

Query operation 520 asks whether the data sector transmission is complete. If there is another user data burst waiting to be written, the answer is no, and control transfers back to operation 508, and operations 508 through 520 are repeated for the next set of user data in the sector. Note that the first time through operations 508 through 520, the preamble symbol and symbol data are transmitted and tested. The preamble symbol and sync symbol are followed, in subsequent iterations through the loop, by user data until the sector data is complete. If the answer to the query in operation 520 is yes, there are no more data to be transferred, control transfers to operation 522 where, again, the controller 144 and ECC status registers are checked to see if the written data and ECC codes match with the data originally to be written. The testing process is now complete, and control returns to normal operations in operation 524.

In summary, the present invention may be viewed as a method of functionally testing the controller (such as in operations 402-424 and 502-524) in a data storage device (such as 100) having a controller (such as 144) and a read/write channel (such as 146) integrated on a semiconductor substrate. The method (such as in operations 402-424) includes steps of: providing a Non-Return to Zero (NRZ) data bus (such as 154) on the substrate between the controller (such as 144) and the read/write channel (such as 146); providing a test first-in/first-out buffer (FIFO) (such as 152) between a microprocessor (such as 142) and the controller (such as 144) via the NRZ data bus (such as 154); sending a burst of data through the FIFO (such as 152) via the NRZ data bus to the controller (such as in operations 402-420); and monitoring the data received by the controller (such as in operation 422).

The present invention may also be viewed as a method of functionally testing the controller in a data storage device (such as 100) having a controller (such as 144) and a read/write channel (such as 146) integrated on a semiconductor substrate including steps of providing a Non-Return to Zero (NRZ) data bus (such as 154) on the substrate between the controller and the read/write channel, providing a test first-in/first-out buffer (FIFO) (such as 152) operably connected to the NRZ data bus, writing a burst of user data (such as in operations 502-520) through the controller (such as 144) to the NRZ data bus (such as 154) to the test FIFO (such as 152), and monitoring the user data received by the test FIFO from the NRZ data bus (such as in operation 522). The method may also include comparing the burst of user data to data received by the test FIFO (such as in operation 518). The method may also include comparing controller and ECC status registers (such as in operation 522) to determine whether the burst of user data sent matches the user data received by the test FIFO buffer (such as 152).

Alternatively, the present invention may also be viewed as a data storage device (such as 100) that has a controller (such as 144) and read/write channel (such as 146) integrated on a semiconductor substrate, a Non-Return to Zero (NRZ) data bus (such as 154) connecting the controller with the read/write channel, and means (such as module 201) on the semiconductor substrate for functional testing of the controller (such as 144). The module 201 may include a test first in/first out buffer (FIFO) and control logic module on the substrate operably connected to the NRZ data bus. The module 201 may include a test FIFO (such as 152) connectable to the NRZ data bus (such as 154), a programmable clock (such as 162 and 164) operable to provide a reference clock signal to the controller (such as 144), a control register (such as 155) connected to the FIFO (such as 152) and providing a clock select (such as on line 158) to a multiplexer (such as 156) connected to the programmable clock, and a counter (such as 160) connected to the reference clock signal operable to stop the reference clock signal to the controller (such as 144) when a predetermined count is reached.

It will be clear that the present invention is well adapted to attain the ends and advantages mentioned as well as those inherent therein. While a presently preferred embodiment has been described for purposes of this disclosure, various changes and modifications may be made which are well within the scope of the present invention. Numerous other changes may be made which will readily suggest themselves to those skilled in the art and which are encompassed in the spirit of the invention disclosed and as defined in the appended claims.

What is claimed is:

1. A device comprising:
   a controller and read/write channel integrated on a semiconductor substrate;
   a Non-Return to Zero (NRZ) data bus connecting the controller with the read/write channel; and
   a control logic module on the substrate operably connected to the NRZ data bus, wherein the control logic module comprises:
   a test first in/first out buffer (FIFO) connectable to the controller and the read/write channel via the NRZ data bus;
   a programmable clock operable to provide a reference clock signal to the controller;
   a control register connected to the FIFO and providing a clock select to a multiplexer connected to the programmable clock; and
   a counter connected to the reference clock signal operable to stop the reference clock signal to the controller when a predetermined count is reached.

2. The device according to claim 1 wherein the test FIFO is connected to a microprocessor.

3. The device according to claim 1 wherein the control register enables the FIFO connection to the NRZ data bus.

4. An apparatus for a data storage device comprising:
   a semiconductor substrate;
   a controller and a read/write channel formed on the substrate;
   a non-return to zero (NRZ) data bus on the substrate connecting the controller to the read/write channel; and
   a test first in/first our buffer (FIFO) formed on the substrate connected to the NRZ data bus between a microprocessor and the controller, wherein the test FIFO is transparent during normal operation of the data storage device and becomes operational when a test mode of operation is set.

5. The apparatus of claim 4 further comprising a programmable clock on the substrate operable to provide a reference clock signal to the controller in the test mode of operation.

6. The apparatus of claim 5 further comprising a multiplexer on the substrate connected to the clock and receiving a clock select signal from a control register connected to the FIFO.

7. The apparatus of claim 5 further comprising a counter receiving the reference clock signal operable to block the reference clock signal to the controller upon a predetermined count.

8. The apparatus of claim 4 wherein the test FIFO captures a data pattern written by the controller to the read/write channel in the FIFO from the NRZ data bus during a test write mode.

9. The apparatus of claim 4 wherein a micro controllable data pattern is sent from the microprocessor to the controller via the FIFO and the NRZ data bus during a test read mode.

* * * * *